July 30, 1968     D. T. McDIVITT     3,395,278
METHOD OF MEASURING THE COATING THICKNESS ON ARTICLES
Filed July 14, 1965
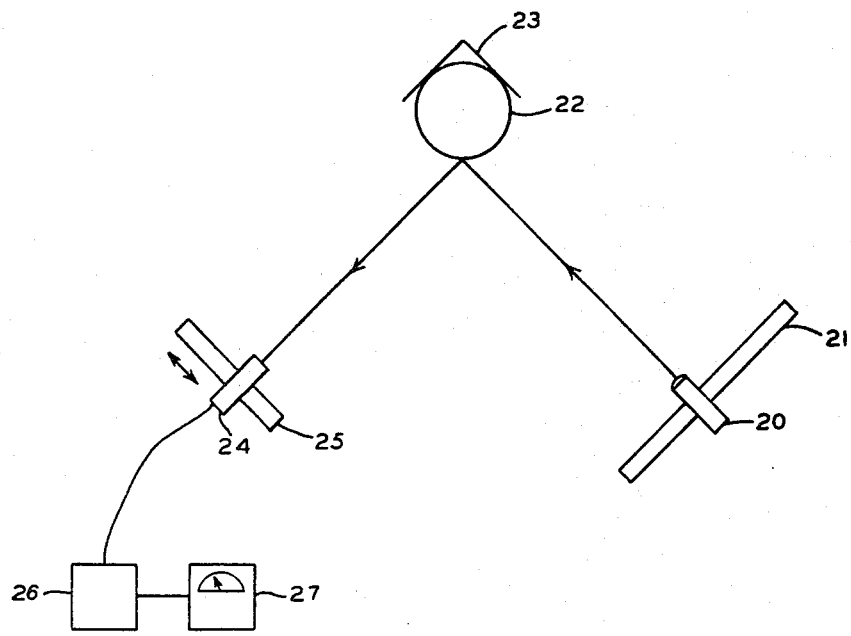
INVENTOR
DAVID T. McDIVITT
BY
ATTORNEY 3,395,278
METHOD OF MEASURING THE COATING THICKNESS ON ARTICLES David T. McDivitt, Lancaster, Pa., assignor to Armstrong Cork Company, Lancaster, Pa., a corporation of Pennsylvania
Filed July 14, 1965, Ser. No. 471,821
2 Claims. (Cl. 250—83.3)

ABSTRACT OF THE DISCLOSURE

The method of measuring coatings on glass containers using a reflectivity device which employs the use of ultraviolet light. To make the glassware scratch resistant, the glassware is provided with a metallo-organic ester which provides a transparent coating on the glassware. The thickness of the coating is measured by a reflectivity device which uses ultraviolet radiation. The metallo-organic ester will cause a certain amount of the ultraviolet radiation to be reflected to an appropriate meter. The amount of reflectivity is directly proportional to the thickness of the coating.

---

A process for making scratch resistant glassware is disclosed in U.S. patent application Ser. No. 395,167, filed Sept. 9, 1964. As disclosed in this application, glassware is coated with a material which renders said glassware scratch resistant. Examples of such coatings are metallo-organic esters such as alkyl titanates, wherein said esters are pyrolyzed to form a coating of titanium dioxide on the surface of glassware. Such a coating may be applied to glassware while it is still hot. Such coatings may be applied in vapor or aerosol form. In any event, once the coating is adhered to the surface of the glassware, it is substantially invisible to the naked eye, especially if the particular glassware is of the soda lime type and transparent. For example, if a jar or bottle of untinted glass is provided with one of the coatings as outlined above, and this coated jar is compared with a similar uncoated jar, the naked eye will be substantially unable to note any difference between the two jars. Further, such coatings do not appear to change the reflectivity characteristics of the glassware when in the presence of ordinary, visible light. It is to be understood that the amount of such coating which is applied to glassware is quite small, having a thickness on the order of 10–40 microns, for example. In any event, apparatus for measuring the coating thicknesses such as that disclosed in U.S. Patent 2,773,412 could not be used to detect the presence of or thickness of the metallic oxide coatings noted above.

Accordingly, it is an object of the present invention to provide a method of determining the thickness of a coating on an article wherein such coating is substantially undetectable by the naked eye.

Other objects of the present invention will be readily apparent from the description below with reference to the drawing wherein:

FIGURE 1 is a schematic view of apparatus which may be used to carry out the method of the present invention.

It was found that soda lime glassware absorbs most of the incident energy of light in the 2700 to 3000 angstrom range. However, when such glassware has a coating of metallic oxide thereon, said coating reflects ultraviolet light in the 2700 to 3000 angstrom range in proportion to the thickness thereof. Therefore, the thicker the coating of metallic oxide, the more ultraviolet light will be reflected. By measuring the degree of reflectivity of the coating and initially calibrating an appropriate meter device, a fairly accurate determination of the thickness of a coating on a subsequent piece of glassware may be made without destructive testing as was required heretofore.

Referring now to FIGURE 1 there is shown an ultraviolet light source 20 which may be suitably and movably mounted upon a support structure 21. The article of glassware 22 to be inspected may be placed in a positioning jig 23. A photocell 24 sensitive to ultraviolet light may be movably mounted upon a track 25. These elements may be located at a point such that the photocell 24 will be in a position to receive a reflected light from the surface of glassware 22 which is to be inspected. Photocell 24 may have manual or motorized means associated therewith such that it may be moved along support 25 in the directions indicated by the arrows. Such adjustment is desirable to give flexibility to the apparatus so that glassware of varying dimensions may be inspected thereon. Further, by causing a reciprocating motion of photocell 24 the point of maximum reflectivity can be determined in each case. In this regard, it is noted that the light source 20 may be provided with similar reciprocating apparatus. Also, if the entire surface of a particular article of glassware is to be inspected, such article of glassware may be suitably supported upon a rotating table or jig corresponding to the position of the jig and glassware shown in FIGURE 1. Thus, the entire periphery of the article to be inspected may be subjected to the light beam from source 20. Further, suitable vertical adjustment means may be provided to obtain further flexibility in inspecting the over-all surface or surfaces of a particular article.

Photocell 24 may be connected through suitable electrical or electronic apparatus such as an amplifier 26, for example, which in turn may be connected to a conventional meter 27 which may be calibrated to reflect to read in units of thickness. Thus, a quick determination may be made with regard to the thickness of a metallic oxide coating on glassware by projecting a beam of ultraviolet light upon the surface of said glassware, measuring the amount of reflectivity of said light from said coated glassware, and converting the measured amount or degree of reflectivity into terms of thickness of coating.

It is to be understood that the method of the present invention is not limited to the particular embodiment shown and described. Various modifications may be made in the present invention without departing from the scope thereof as defined in the claims.

I claim:

1. A method of determining the thickness of a metallic oxide coating on soda lime glassware which coating is increasingly reflective to ultraviolet light as the thickness of said coating is increased comprising the steps of projecting a beam of ultraviolet light on said coated glassware, measuring the degree of reflectivity of light from said coating, and converting the degree of measured reflectivity into a reading of thickness.

2. A method according to claim 1 wherein said metallic oxide coating contains titanium dioxide.

References Cited

UNITED STATES PATENTS 2,773,412   12/1956   Huck  ------------  250—234 X
3,016,464    1/1962   Bailey  ------------  88—14 X RALPH G. NILSON, *Primary Examiner.*

S. ELBAUM, *Assistant Examiner.*